United States Patent [19]
Henkelmann

[11] Patent Number: 5,643,544
[45] Date of Patent: Jul. 1, 1997

[54] APPARATUS AND METHOD FOR RENDERING VOLATILE ORGANIC COMPOUNDS HARMLESS

[75] Inventor: Gary L. Henkelmann, Elgin, Ill.

[73] Assignee: Applied Web Systems, Inc., Elgin, Ill.

[21] Appl. No.: 430,376

[22] Filed: Apr. 28, 1995

[51] Int. Cl.⁶ .......................................... B01J 8/00
[52] U.S. Cl. ...................... 423/245.3; 122/511; 422/183; 431/5
[58] Field of Search ...................... 431/166, 215, 431/5; 422/182, 183; 423/245.3; 122/511; 165/297, 298

[56] References Cited

U.S. PATENT DOCUMENTS

| | | |
|---|---|---|
| 2,805,049 | 9/1957 | Katholi . |
| 2,986,454 | 5/1961 | Jewett . |
| 3,326,279 | 6/1967 | Eisberg et al. . |
| 3,806,322 | 4/1974 | Tabak ........................................... 431/5 |
| 3,898,040 | 8/1975 | Tabak ........................................... 431/5 |
| 4,444,735 | 4/1984 | Birmingham ................................ 431/5 |
| 4,576,228 | 3/1986 | Glatthorn . |
| 4,623,017 | 11/1986 | Oda et al. . |
| 4,666,677 | 5/1987 | Ramus et al. . |
| 5,200,155 | 4/1993 | Obermueller ............................ 422/183 |
| 5,323,849 | 6/1994 | Korczynski, Jr. et al. . |
| 5,516,499 | 5/1996 | Pereira ..................................... 431/215 |

*Primary Examiner*—Carroll B. Dority
*Attorney, Agent, or Firm*—Mathew R. P. Perrone, Jr.

[57] ABSTRACT

A modular thermal oxidizing device has a heat exchanger and a burner chamber connected to convert volatile, condensable organic compounds to harmless gasses. The heat exchanger includes an internal cold side bypass with cooling tubes extended into a hot side adjacent to the burning chamber. An appropriate aperture or hole tolerance related to the tubes as mounted within the hot side tube sheet is adopted to permit efficient expansion and contraction of the tubes without binding in the tube sheet.

17 Claims, 5 Drawing Sheets

APPARATUS AND METHOD FOR RENDERING VOLATILE ORGANIC COMPOUNDS HARMLESS

This invention relates to the field of environmental protection, and especially protection from pollution caused by volatile organic compounds; and, more specifically, to a modular thermal oxidizing device for converting highly polluting, volatile, organic compounds to a harmless substance and a method for using the same.

BACKGROUND OF THE INVENTION

The control of pollution in the environment is extremely important. Environmental problems create great health risks and severely decrease the quality of life. A primary source of material for such pollution and this decrease in this quality of life is the evaporation of volatile organic compounds into the atmosphere.

Some essential features of pollution control are discussed from one aspect in U.S. Pat. No. 4,666,677 issued to Gary D. Ramus and Christopher R. Ahnen. The pollution control device defined therein is not applicable to all situations. In some cases, a more energy efficient operation is required. The structure disclosed in that patent is not applicable to a situation requiring a more energy efficient, such as a tube type, heating or cooling mechanism.

These volatile organic compounds adversely affect the ozone layer and interfere with the proper functioning of even the oxygen content of the atmosphere. The presence of these volatile organic compounds in even minute amounts can cause great harm to a person breathing the same.

Yet volatile organic compounds are very important in industry. Without these volatile organic compounds, some of the necessities of life become prohibitively expensive. Accordingly, it is highly desirable to reduce the problems caused by the use thereof and give an improved result for the conversion of these compounds into harmless materials. Typical industries, which use these volatile organic compounds in industrial processes, are the printing industry and the converting industry. The converting industry basically adapts foil, film, paper, and other packaging raw materials for use as packaging material.

It is known to use a thermal oxidizer to destroy the harmful volatile compounds from various industrial processes. Inherently the thermal oxidizer operates at very high temperatures usually in excess of 700 degrees Centigrade. Such high temperature operation creates severe problems in developing a durable device for the conversion process.

A thermal oxidizer usually is require to have at least one expansion joint and other stress relief point. This expansion joint complicates the structure of the thermal oxidizer. The stress relief point also adds complications.

In particular, the heat exchanger for use in a pollution control device generally contains a series of tubes or pipes whereby the transport gases containing the volatile organic compounds are cooled after they have been heated. For a heat exchanger, the terms, tube or pipe, may be used interchangeably. The harmless gases, thus formed by heating the volatile organic compounds to a decomposing point or destruction point, can be handled more easily and return energy to the continuing process. It is a difficult proposition to balance the structure of the tubes and support these tubes within the heat exchanger, while effecting an isolation of the two gas streams.

Within the heat exchanger, there is a cold side and a hot side, each delineated by a tube sheet. Due the greater change in temperature, there is more contraction and expansion of the tube by the hot side tube sheet. This expansion and contraction makes tube support at the hot side tube sheet a difficult proposition.

As above-indicated in the heat exchanger, there is a tube sheet support assembly, usually having a hot side sheet and cold side sheet. These sheets combine to support the tubes in the heat exchanger in a desired fashion. The integrity of the tube sheet assembly, and especially the hot side tube sheet, is highly important to the heat exchanger for use in the combustion of the volatile organic compounds. The tube sheets provide for the required separation of the two air streams. Yet while the heat exchanger is in use, the structure thereof can cause the tube sheets to crack.

Once the tube sheet cracks or otherwise becomes defective, the heat can escape to the outside shell of the heat exchanger. Contaminated air can also escape, with highly adverse environmental results. Such defects at worst destroy the unit, and at best greatly reduce the efficiencies of the unit.

This is especially critical when the Environmental Protection Agency is requiring efficiencies of combustion for these volatile organic compounds in excess of 95 percent. With the movement of the tubes caused by thermal expansion in normal operation temperature within the tube sheet, these problems are created, and a weakness in the heat exchanger and a reduction of the efficiencies thereof occur.

Other attempts to support the tube sheet are known to involve a packing system to insert insulation around the tube sheet and the tubes therein. This insulation does not withstand the strain of the process. The tubes still bind up within the hole pattern and force the sheet upward or downward during a cooling process. The hole clearance is completely lacking, and no give in the sheet is supported. This leads to a fracturing of the tube sheet and failure of the device.

It is also quite common for the volatile organic compounds or a carrier therefor to reach too high a temperature before reaching the combustion chamber. It highly desired to provide a bypass for such a device. The current bypass system is an external device on a thermal oxidizer. This external structure adds to the bulk of the device and geometrically increases the installation difficulties. Fouling of this external damper also occurs from continued condensation of airstream contaminants or pollutants, which have high boiling points.

In a known device, an external damper is used to avoid an overload on the oxidizing device or preignition of the polluted air. This external damper adds to the bulk of the oxidizing device, thereby causing a great reduction in the utility of the device. Space is sometimes a major problem for installation of a device to convert volatile organic compounds to a harmless gas.

Thus, a solution this volatile organic pollution problem must provide a device capable of operating efficiently at high temperature. There must also be a efficient provision for handling an excess of pollutants in the form of volatile organic compounds.

SUMMARY OF THE INVENTION

Among the many objectives of this invention is the provision of a modular thermal oxidizing device, having a strongly supported set of tubes mounted in a tube sheet with a cold side bypass damper incorporated directly therein to avoid an overload of the modular thermal oxidizing device.

Another objective of this invention is to provide a modular thermal oxidizing device, which controls the emission of volatile compounds.

Yet another objective of this invention is to provide a modular thermal oxidizing device, which minimizes health risks of a volatile organic compound.

Still another objective of this invention is to provide a modular thermal oxidizing device, which maintains quality of life.

Additionally, an objective of this invention is to provide a modular thermal oxidizing device to minimize effect on the ozone layer by volatile organic compounds.

Also, an objective of this invention is to provide a modular thermal oxidizing device which can minimize damage caused to person who may breathe volatile organic compounds.

A further objective of this invention is to provide a modular thermal oxidizing device, which is easily installed.

A still further objective of this invention is to provide a modular thermal oxidizing device, which permits continued use of volatile organic compounds in the printing industry.

Yet a further objective of this invention is to provide a modular thermal oxidizing device, which permits continued use of volatile organic compounds in the paper or film converting industry. Another objective of this invention is to provide a modular thermal oxidizing device, which eliminates the need for an external damper control.

Yet another objective of this invention is to provide a modular thermal oxidizing device, which permits continued use of volatile organic compounds in the paper or film converting industry.

Still another objective of this invention is to provide a modular thermal oxidizing device, which provides a bypass for an excess of volatile organic compounds coming therethrough.

Additionally, an objective of this invention is to provide a modular thermal oxidizing device to simplify mounting of tubes in the tube sheet thereof.

Also, an objective of this invention is to provide a method for minimizing the injury caused to person who may be exposed volatile organic compounds.

A further objective of this invention is to provide a method for easily installing a device to convert volatile organic compounds to a harmless gas.

A still further objective of this invention is to provide a method, which permits continued use of volatile organic compounds in the printing industry.

Yet a further objective of this invention is to provide a method, which permits continued use of volatile organic compounds in the converting industry.

Another objective of this invention is to provide a modular thermal oxidizing device, which eliminates the need for an expansion joint.

Yet another objective of this invention is to provide a modular thermal oxidizing device, which eliminates the need for a stress relief point.

These and other objectives of the invention (which other objectives become clear by consideration of the specification, claims and drawings as a whole) are met by providing a modular thermal oxidizing device with a burner chamber interconnected with a heat exchanger. The heat exchanger has an internal cold side bypass with cooling tubes extended into a hot side adjacent to the burning chamber. An appropriate aperture or hole tolerance related to the tubes as mounted within the hot side tube sheet is adopted to permit efficient expansion and contraction of the tubes without binding in the tube sheet.

BRIEF DESCRIPTION OF DRAWINGS

Throughout the figures of the drawings where the same part appears in more than one figure the same number is applied thereto.

DESCRIPTION OF PREFERRED EMBODIMENTS

Figure 1:
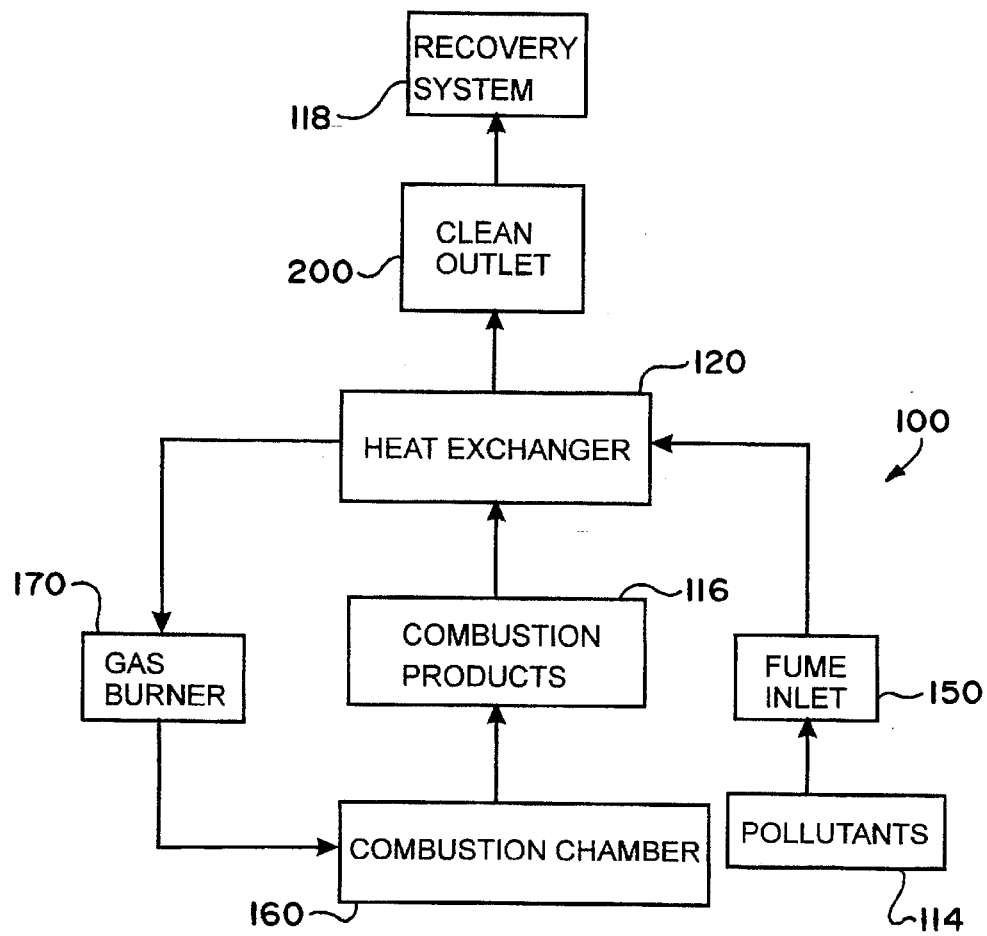
FIG. 1 depicts a block diagram of the modular thermal oxidizing device 100 of this invention.

A modular thermal oxidizing device includes a combustion chamber and a heat exchanger for use as a cooling chamber. The cooling chamber includes a cold side bypass using an internal bypass assembly to avoid preignition of the pollutants. The cooling chamber has a hot side tube sheet and a cold side tube sheet. The tubes in the cooling chamber are secured to the cold side tube sheet. The cooling tubes are extended through the hot side tube sheet in order to provide for an extremely efficient conversion of volatile organic hydrocarbons to a harmless gas. In this fashion, the construction of the heat exchanger is greatly simplified. Each tube rests in its own aperture in the hot side tube sheet, with an appropriate clearance to avoid binding between the tubes and the hot side tube sheet.

The tubes on the opposite side of the cold side tube sheet extend beyond the hot side tube sheet into the combustion chamber. This extension of the cooling tubes into the combustion chamber permits the cooling tubes to operate without being secured to the tube sheet. So as the temperature of the hot side changes, each tube can expand or contract as required.

In this fashion binding of the tube in the hot side tube sheet is avoided, along with the resulting damage to the tube sheet and the modular thermal oxidizer. Each tube is welded in its respective cold side tube sheet aperture. This structure combines with the hot side tube sheet to support tubes in the heat exchanger.

Preferably, each tube extends into the combustion chamber up to about 85 centimeters. More preferably, each tube extends into the combustion chamber from about 10 centimeters to about 75 centimeters. Most preferably, each tube extends into the combustion chamber from about 15 centimeters to about 50 centimeters.

Each tube is welded in its respective cold side tube sheet aperture. This structure combines with the hot side tube sheet to support tubes in the heat exchanger.

As the extended tube runs from the hot side tube sheet into the cool side tube sheet, the structure serves to appropriately cool the harmless gasses passing through the tubes. At the same time, the pollutants through the heat exchanger, but around and outside the tubes, are warmed on their way to the combustion chamber. In this fashion, the energy efficiency of the modular thermal oxidizer is greatly increased.

Also, when the volatile organic compounds approach a temperature greater than their ignition temperature, there can be a shunt, or cold side bypass, which permits the polluted fumes to pass more directly through the heat exchanger to the combustion chamber. This feature avoids preignition of the pollutants, and the inherently resulting damage to the modular thermal oxidizer, and especially the cooling chamber.

This cold side bypass, being mounted internally in the heat exchanger, eliminates an external damper and permits a more compact design for the modular thermal oxidizer. As usual, size is an important factor in the placement and function of the heat exchanger. Thus, these are some of the features that make the modular thermal oxidizer of this invention significantly different and superior to those models of the prior art.

Appropriate ductwork connects the polluted process fumes to the heat exchanger, which permits intake of the polluted air and volatile organic compounds into the heat exchanger. Likewise, appropriate ductwork conveys the heated and polluted air to the burner assembly in the combustion chamber.

Some of the superior features of the modular thermal oxidizer of this invention include, but are not limited to, a compact modular design, a high operating temperature, a great reduction in volume of fuel used, and an internal cold side bypass. These features combine to provide for an extremely efficient thermal oxidizer. Typically these features include a 815 Celsius or Centigrade (1,500 Fahrenheit) Degree operating temperature, an eight to one volumetric turndown ratio and an internal cold side bypass for excess pollutants.

The modular design of the modular thermal oxidizer integrates an energy efficient shell and tube heat exchanger with a separate ceramic fiber lined combustion chamber. The separate modules, for the combustion chamber and heat exchanger, enable the modular thermal oxidizer to be installed in a stacked, in-line, side-by-side, or L-shaped configuration for maximum efficiency and flexibility in locating the unit. Also, easy access to both modules facilitates routine inspection and maintenance.

The modular thermal oxidizer is capable of a high, sustained operating temperature. It is desired for the modular thermal oxidizer to have a sustained operating temperature in the range of about 700 Degrees (700° C.) Centigrade to about 900 Degrees (900° C.) Centigrade. More preferably, the modular thermal oxidizer may have a sustained operating temperature in the range of about 750 Degrees (750° C.) Centigrade to about 850 Degrees (850° C.) Centigrade. Most preferably, the modular thermal oxidizer may have a sustained operating temperature in the range of about 800 Degrees (800° C.) Centigrade to about 825 Degrees (825° C.) Centigrade. A very useful operating temperature is about 815 Degrees (815° C.) Centigrade (1,500 Degrees Fahrenheit or 1,500° F.).

This structure for the modular thermal oxidizer is a completely flexible layout. The separate burner or combustion chamber, and the separate heat exchanger permit great flexibility in installation. The flow through the modular thermal oxidizer includes polluted air going into the heat exchanger and around the heat exchange tubes to cool the same through several layers.

The polluted air is monitored for temperature in the heat exchanger. If it achieves a certain temperature, a warning switch activates a cold side bypass to permit the polluted air to proceed more directly into the burner before it passes over the entire heat exchanger. In this fashion, the pre-ignition of the organic material in the polluted air is avoided. Such pre-ignition can damage the exchanger substantially.

As the polluted air containing the volatile organic compounds passes over the tubes of the heat exchanger, it cools the already burned or converted volatile organic compounds, now clean air passing through the pipes of the heat exchanger. With the polluted air passing over the tubes, instead of through the tubes, the tubes cannot be plugged or contaminated by the condensable volatile organic compounds. The polluted air is also warmed to a point so that it may be more easily ignited in the burner.

In the combustion chamber is a modulated burner cone. The modulated burner cone measures and reacts to the air flow by adjusting its position accordingly, pursuant to an electrical or a mechanical interpretation of the air flow. This movement permits an efficient use of the burner and fuel therefor, while permitting, the burner cone to last the life of the modular thermal oxidizer, in most cases.

This adjusting of the modulator burner cone permits a uniform air flow around the air corridor of the burner cone and provides for very efficient burning of the fuel ratio. The welding of the tubes to the cold side sheet and the freedom of the tubes of expanding in the other end or hot side sheet permits a very flexible design and use of the heat exchanger. This combination of the burner cone in combination with the other structure of the modular thermal oxidizer contributes greatly to the flexibility of this design, for a volume of pollutants.

The shell or outer surface of both the combustion chamber and the heat exchanger are preferably formed of carbon steel or a material having equivalent qualities. In fact, but for the insulation and the tube, the preferred material for all parts of the modular thermal oxidizer, including ductwork, is carbon steel or an equivalent thereof, having the capability to function with longevity in the required operating temperature range. The tube sheets and each sheet dividing the heat exchanger into sections are preferably stainless steel or an alloy thereof.

The tubes and tube sheets of the heat exchanger are the only elements of the device which prefer stainless steel or an alloy thereof to be used. Any material which can resist the temperatures used and provide durability for the apparatus is operable.

Ceramic fiber insulation as a lining both in the combustion chamber, which contains the burner, and the heat exchanger makes the shell of the modular thermal oxidizer substantially impervious to thermal shock. A typical insulation is marketed under the name K-Lite Block, from Engineered Thermal Systems, Inc. of Streetsboro, Ohio.

The modular design uses the space allocation adequately and the cold side bypass avoids premature ignition of the pollutants. The internal cold side bypass makes best use of the space allocation, and protects the movable damper components from fouling due to the condensable volatile organic compounds.

The flexibility in the hot side sheet avoids the need for expansion joints. Each tube slides into its own aperture in the hot side tube sheet. Each aperture in the hot side tube sheet has a diameter of up to about 110 percent of the outside diameter of the tube resting therein. More preferably, each aperture in the hot side tube sheet has a diameter of above 100 percent to about 109 percent of the outside diameter of the tube resting therein. Most preferably, each aperture in the hot side tube sheet has a diameter of about 101 percent to about 103 percent of the outside diameter of the tube resting therein.

The aperture and outside diameter ratio or the tube permits the heat exchanger to compensate for tube expansion and contraction without compromising the tube sheet. In the event that the polluted air goes through the hot side tube sheet due to the higher pressure in the heat exchange area as opposed to where the burned air enters the heat exchanger, the limited aperture clearance in the hot side sheet causes what little dirty or polluted air that does leak therethrough to be combusted when it contacts the environment of the combustion chamber and is made harmless. That air mixture then passes through the heat exchange tubes and out, even though it has bypassed the burner.

When the volatile organic compound laden air dirty air leaks around the pipes and passes through the hot side tube sheet and out of the heat exchanger, it gets heated by the combustion products approaching the heat exchange tubes, and decomposes or is converted into the required safe ingredients. Thus, the sealing effect formed by the elongated, heat exchange tube is primary and provides for a strong disbursal and prevents cross-stream contamination, until adequate heat and residence of the bypass gasses decompose the pollutants and render them harmless.

This is especially useful in the printing industry where it uses highly condensable organic volatile compounds, which, if they cool, will gum up and tar the works of the machine. With the damper or cold side bypass of this invention mounted internally within the heat exchanger, and not externally, an additional advantage is provided. Having the damper inside of the heat exchanger means that the damper never cools. Then, the entire system can stay warm and avoid the condensate fouling problems, inherent in unheated external bypass systems.

Polluted unclean air, typically from a printing process dryer, enters the heat exchanger through a fume inlet. The fume inlet directs the pollutants around the heat exchanger tubes where it is preheated. The primary heat exchanger supplies most of the energy needed to elevate the polluted air temperature to the required operating temperature. Solvent fuel from the process plus additional fuel, typically natural gas, are combusted to maintain the operating temperature set point.

The internal cold side bypass is an important feature of the modular thermal oxidizer. If the preheated air becomes too hot, it can cause combustion of the solvent fuel hydrocarbon before reaching the combustion chamber, which may damage the heat exchanger and burner and possibly produce a run away temperature condition. The bypass permits the pollutants to pass more directly to the burner, without completing the full cycle through the heat exchanger.

The heated uncleaned air now enters the combustion chamber through and around the burner cone assembly. The modulating burner cone assembly is used in the modular thermal oxidizer unit. Because the amount of air flow can change with production due to processes coming on line and going off line, the modular thermal oxidizer burner logic continuously measures and reacts to air flow changes by moving into and out of the air stream. Complete burning of hydrocarbons at lower flow rates and in idle situations is achieved without the need for additional outside air intake.

Only the modular thermal oxidizer's modulating burner function produces an eight to one volumetric turndown ratio. That means it is less costly to operate the unit in low mode or idle conditions than with other conventional systems.

Since the burner assembly modulates a uniform air velocity is created around the entire burner cone.

This uniform air flow maintains an even cone temperature which by design eliminates the primary cause of burner cone failure. The burner cone is not considered a consumable part and is expected to last the life of the unit, thereby creating substantial savings and increase in efficiency.

Another innovative feature is that the combustion chamber and the heat exchanger are lined with a ceramic fiber insulation that is impervious to thermal shock. With the insulation on the inside of the modular thermal oxidizer's outer shell, the need for expansion joints and other stress relief points is eliminated.

As air moves through the combustion chamber which is designed for sustained 815° Centigrade (1500° Fahrenheit) degrees operation, hydrocarbon emissions are eliminated by being converted into harmless gasses. This operating temperature is successfully maintained for up to about fifteen seconds by the modular thermal oxidizer's unique design. More preferably, this operating temperature is maintained for about one-half second to about thirteen seconds. Most preferably, this operating temperature is maintained for about one second to about eight seconds.

The separate tube type heat exchanger compensates for thermal expansion. The hot clean air releases heat as it passes through these tubes. The tubes on the cold side end are welded to a tube sheet holding them in place, but on the hot end the tubes are not welded. They are inserted through and beyond the separate hot side tube sheet. The heat dissipates as the clean air travels through the tubes and moves out of the clear outlet.

Optional secondary and tertiary heat exchange devices can be added at this point. With these devices adjacent to the clean air outlet, heat contained therein may be used in other processes or for other purposes.

The modular thermal oxidizer also includes a programmable logic controller built into the control panel. With this feature, various temperatures throughout the modular oxidizer can be monitored. Air flow can also be monitored. If any monitored element is outside a desired range or parameter, an appropriate correction can be made.

The modular design produces efficient space allocation. The cold air bypass prevents dangerous premature combustion. The modulating burner permits an eight to one turn down ratio for cost effective operation. Ceramic fiber insulation prevents thermal shock. This separate combustion and heat exchanger design clearly meets and may exceed the Environmental Protection Agency standards of pollution control regarding volatile organic compounds.

In order for the heat exchanger to manage this heat and tolerate thermal shock, the stainless steel tubes entering the combustion chamber are allowed to float freely through the hot-side tube sheet. This unrestrained design allows the tubes to expand or contract individually thus eliminating thermal stress between the heat exchanger tubes and tube sheets, especially the hot side tube sheet.

The tubes are welded or otherwise secured on the cold-side of the heat exchanger to a second or cold side tube sheet. The interior of the heat exchanger and combustion chamber shell is lined with ceramic insulation, which protects and safeguards the metallic shell of the modular thermal oxidizer from thermal shock.

Incorporation of a burner with an eight to one volumetric turndown ratio enables the unit to destroy hydrocarbon emissions at lower air flow rates without the need for additional outside air intake. The preferred fuel is natural gas. The modulating raw gas burner is directed in and out of the air stream to allow for complete burning at lower process flow rates and idle conditions.

Preferably, the modulating raw gas burner is a burner available from Applied Web Systems, Inc. of Elgin, Ill., under the name Smartburner™, This burner is directed in and out of the air stream to allow for complete burning at lower process flow rates and idle conditions. In addition to the raw gas consumption savings, the modular thermal oxidizer Smartburner™ feature greatly improves burner cone life expectancy.

The modular thermal oxidizer of this invention also features a cold side bypass. The bypass operates when the temperature of the preheated air or airstream solvent-loaded polluted air is great enough to cause premature combustion of the pollutants before the stream reaches the combustion chamber. Unlike a hot side bypass, the response of a cold side bypass is immediate and prevents the unit from experiencing runaway temperature conditions, which will prematurely end the operation of the modular thermal oxidizer. These features of the modular thermal oxidizer can be even more effective with a durable control mechanism for the operation. The control mechanism may be any programmable logic controller, or a dedicated controller with relay logic.

With the computer control, the modular thermal oxidizer of this invention becomes a great improvement over the known pollution control systems. The proven efficiency of this design can support and assure at least a ten year life expectancy of the modular thermal oxidizer. Even a fifteen year life is clearly possible.

In addition to these standard features, other options may be added to the modular thermal oxidizer. These options include, but are not limited to, a secondary heat exchanger, a tertiary heat exchanger and an absorption chilling systems.

An especially suitable, user friendly logic controller for use with the modular thermal oxidizer is the GE 90/30 series Programmable Logic Controller and a Variable A/C Drive on the system fan, available from the General Electric Company of Schenectady, New York, which makes the modular thermal oxidizer an extremely efficient pollution control solution. The proven efficiency and thorough attention to quality in manufacture and installation are all factors that support and assure the highly desired 15 year life expectancy of the modular thermal oxidizer.

The construction of the tubes in the heat exchanger is a very difficult problem. The tubes must be made so that they do not corrode easily. Yet at the same time, the tubes must be durable and support the long life of the heat exchanger. The lengthening of these tubes into the combustion chamber solves this problem. Any pollutants leaking from the high pressure of the heat exchanger to the lower pressure combustion chamber through the side sheet apertures are converted by the hot gas therein. With the extended tubes in the combustion chamber, the dwell time for any pollutants which leak therethrough is sufficient for combustion of the leaked pollutants, before the gas enters the tube on the way to the exhaust stack.

Referring now to FIG. 1, the modular thermal oxidizer 100 includes pollutants 114 passing into fume inlet 150. The fume inlet 150 feeds the pollutants 114 into the heat exchanger 120. The pollutants 114 leave the heat exchanger 120 and pass to the gas burner 170. The pollutants 114 pass from the gas burner 170 into the combustion chamber 160 where combustion products 116 are formed. The combustion products 116 pass from the combustion chamber 160 into the heat exchanger 120 where they are cooled by incoming pollutants 114. The combustion products 116 are then passed to a clean outlet 200, which permits the dissipation of the combustion products 116 as harmless materials to be disbursed into the atmosphere. Alternatively, the combustion products 116 may pass into a recovery system 118, to be used for their remaining heat value.

Figure 2:
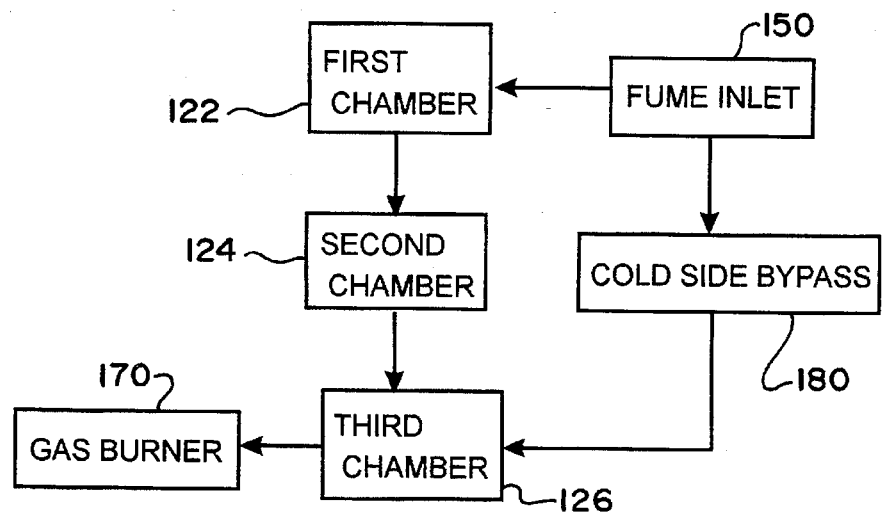
FIG. 2 depicts a block diagram of the heat exchanger 120 for the modular thermal oxidizing device 100 of this invention.
Figure 3:
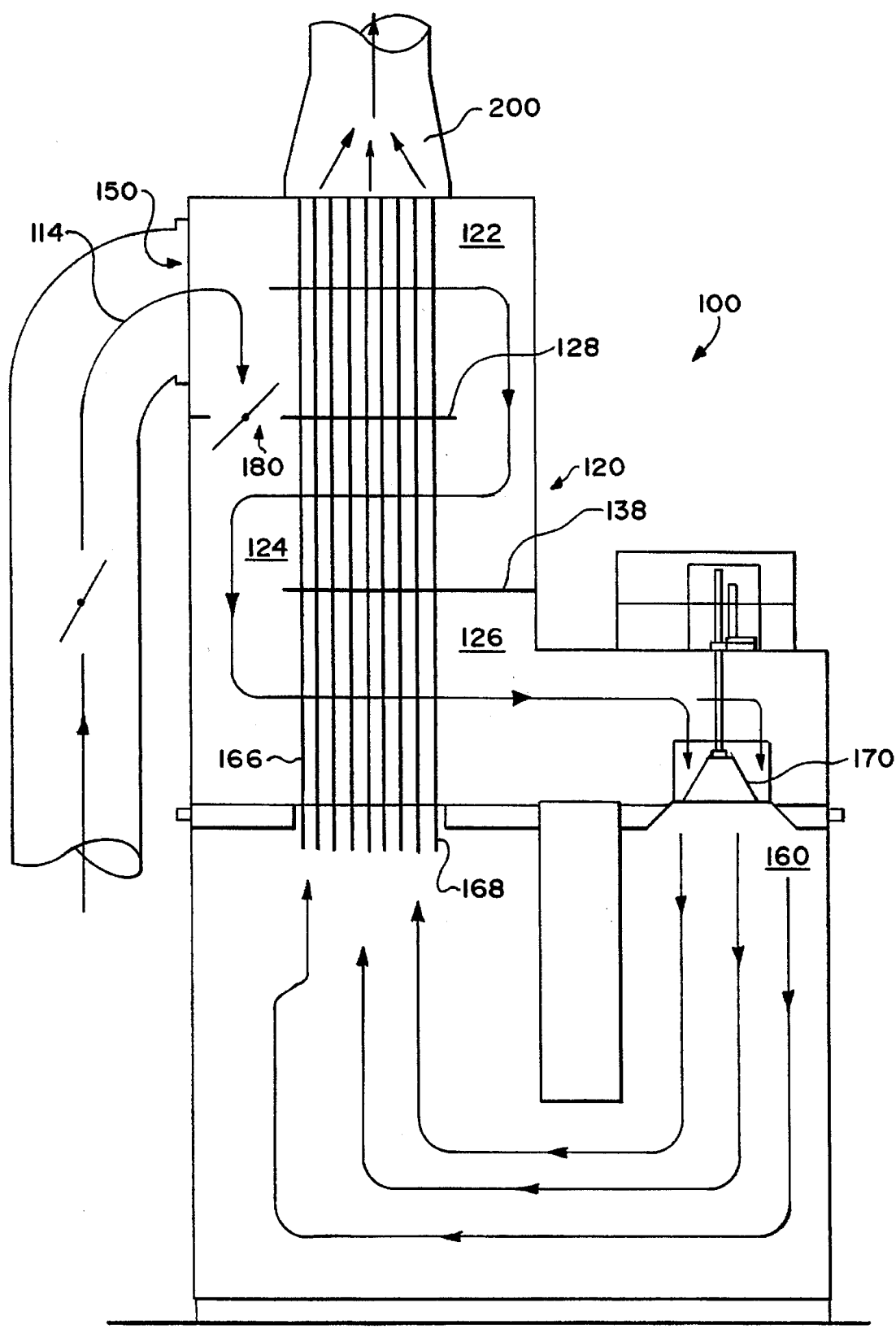
FIG. 3 depicts an air flow diagram of the modular thermal oxidizing device 100 of this invention.

Referring now to FIG. 2 and FIG. 3, the heat exchanger 120 is more clearly defined. The heat exchanger 120 includes a first chamber 122, a second chamber 124 and third chamber 126. The fume inlet 150 feeds directly into the first chamber 122 and is cycled into the second chamber 124 by first chamber wall 128 and cycled into the third chamber 126 from the second chamber 124 by second chamber wall 130.

The modular thermal oxidizer 100 also features a cold side bypass 180. The bypass 180 operates when the preheated air temperature or airstream solvent-loading of fumes is great enough to cause premature combustion before the solvent reaches the combustion chamber 160. Unlike a hot side bypass the response of a cold side bypass 180 is immediate, preventing the modular thermal oxidizer 100 unit from experiencing runaway temperature conditions. Cold side bypass 180 permits pollutants 114 to pass directly to third chamber 126, because preheating is not needed.

Figure 4:
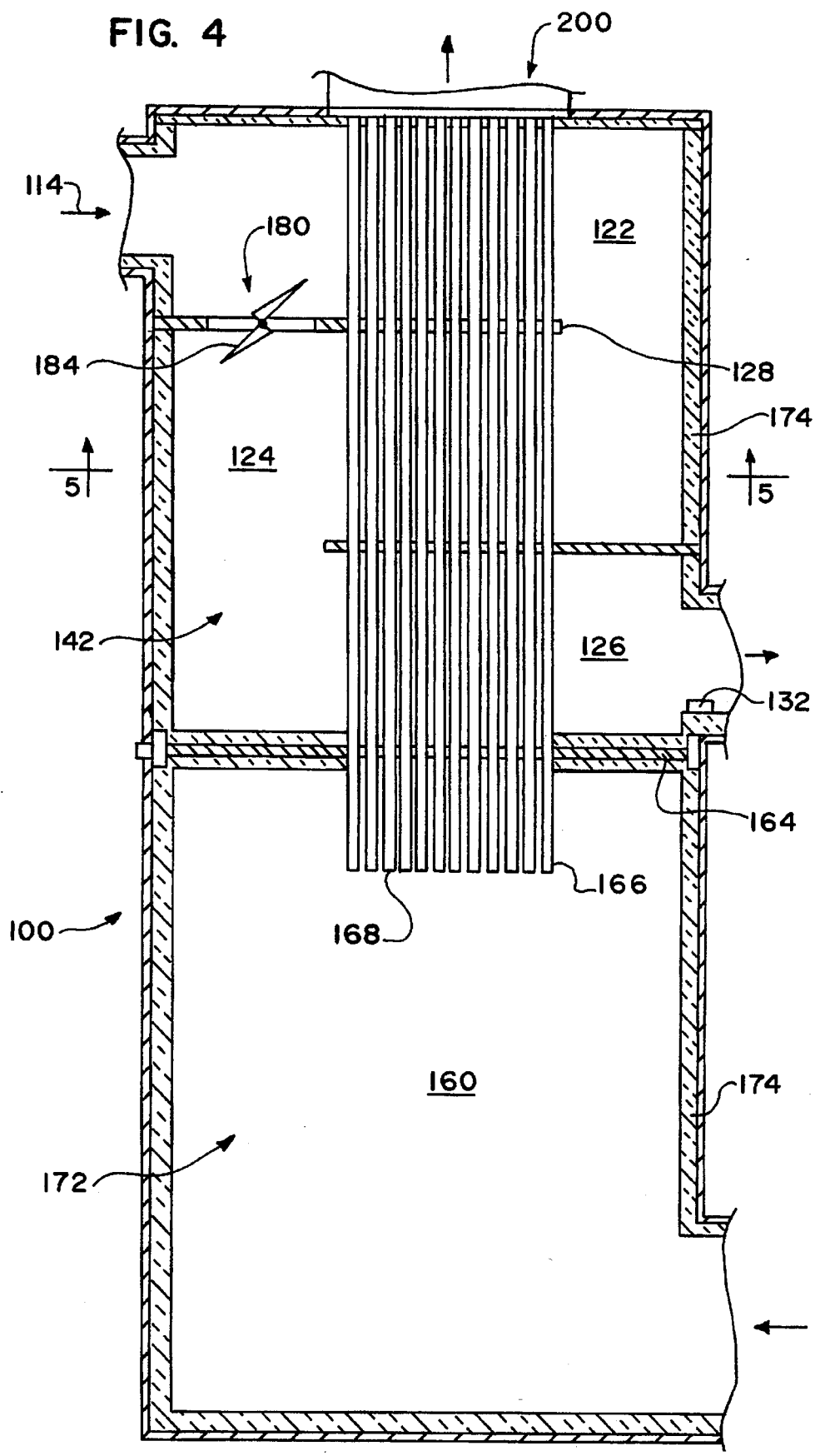
FIG. 4 depicts a side cross-section of the modular thermal oxidizing device 100 of this invention, showing the cold side bypass 180.

Adding FIG. 3 to the consideration, polluted air with pollutants 114 containing the volatile organic compounds enters the first chamber 122, the air cools the portion of tubes 166 therein. This contact warms the polluted air or pollutants 114. Warming continues through second chamber 124 and third chamber 126 so that the pollutants 114 are prewarmed before they reach the burner 170. Around the third chamber wall 126 as shown in FIG. 4, is a thermocouple 132, which senses the temperature of the polluted gases or pollutants 114. If the gas temperature exceeds a predetermined level such that the thermocouple 132 senses that the gases may ignite before entering the combustion chamber 160, a signal (preferably an electric signal) is sent to the cold side bypass 180 mounted in first chamber wall 128. The cold side bypass 180, of course, includes the thermocouple 132.

Figure 5:
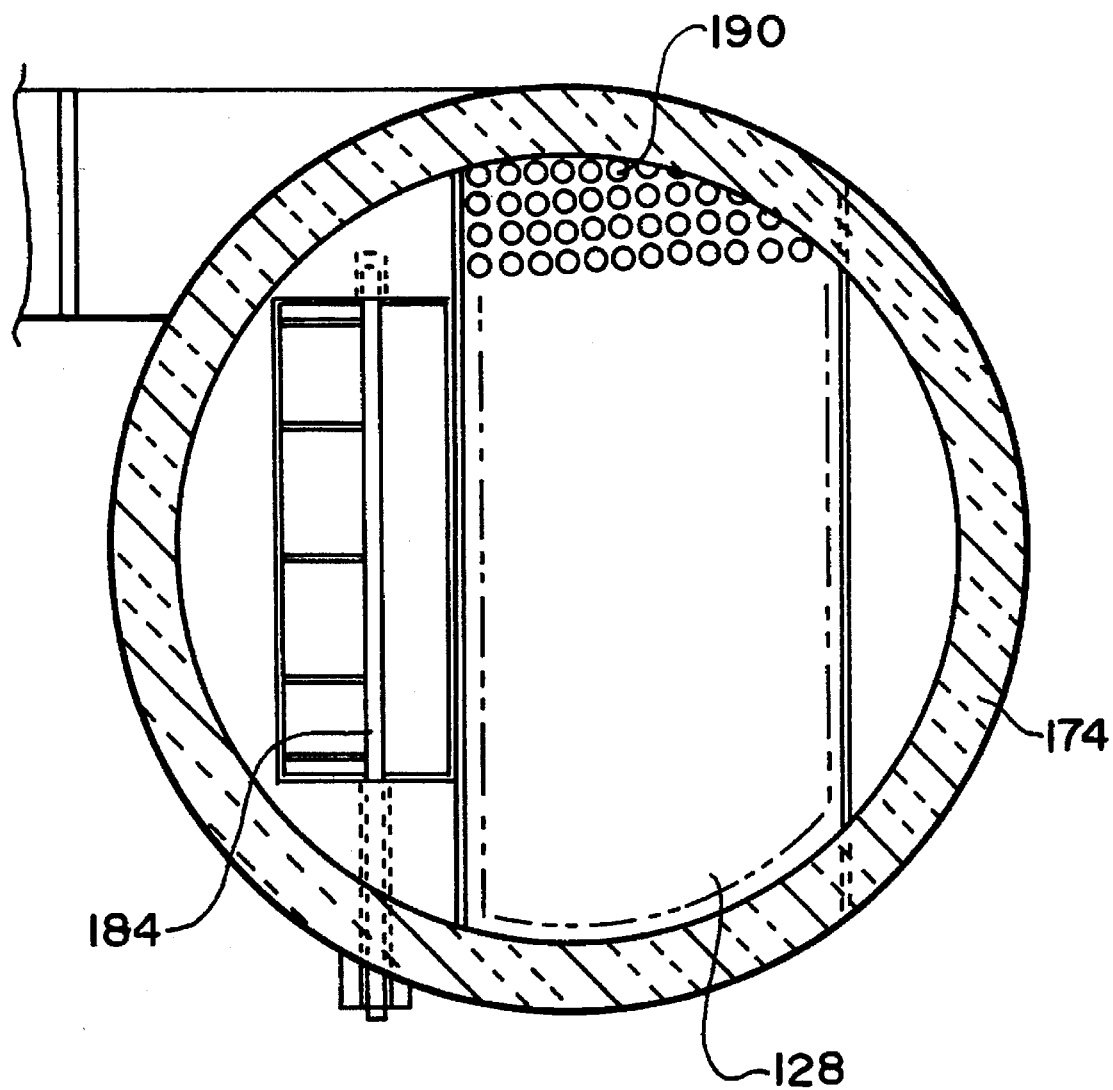
FIG. 5 depicts a end, plan cross-section of the modular thermal oxidizing device 100 of this invention, showing the cold side bypass 180.

As the thermocouple 132 receives the information showing the incoming pollutants 114 having a temperature sufficient to cause ignition before reaching the burner 170, a baffle 184 shown in FIG. 5 is operated and permitted to open. The pollutants 114 or polluted fumes can bypass the first chamber 122 and the second chamber 124 of heat exchanger 120, reach the third chamber 126 directly and thence the combustion chamber 160.

The first exchange chamber 122 of the heat exchanger 120, of course, is the coolest. As the gas passes from the second exchange chamber 124 to the third exchange chamber 126, the third exchange chamber 126 is closest to the combustion chamber 160 with the hottest gasses coming therethrough. Thus, the third chamber 126 contains the hottest gases.

In this fashion, the incoming fumes can both cool the combusted gasses, and provide for the combusted gases at clean outlet 200 to be cooled upon entering the atmosphere. The positioning of the cold side bypass 180 in first chamber wall 128 permits the bypass 180 to be warmed. The warmed bypass 180 prevents condensing of the volatile organic compounds in the cold side bypass 180, and the principal operation of the modular thermal oxidizer 100 can proceed. If the fumes are of the appropriate temperature, they pass through the burner 170 into the combustion chamber 160.

The combustion chamber 160 provides of sufficient heat, usually up around 815° C. (1,500° F.) to permit combustion of the polluting fumes and conversion into harmless ingredients. The combusted fumes circulate through the combustion chamber 160 and pass through the tubes 166 into the heat exchanger. The recycling permits maximum use of heat and maximum of combustion. With the clean air passing through the tubes 166, there is also less chance of any contamination of gasses released to the atmosphere.

Figure 6:
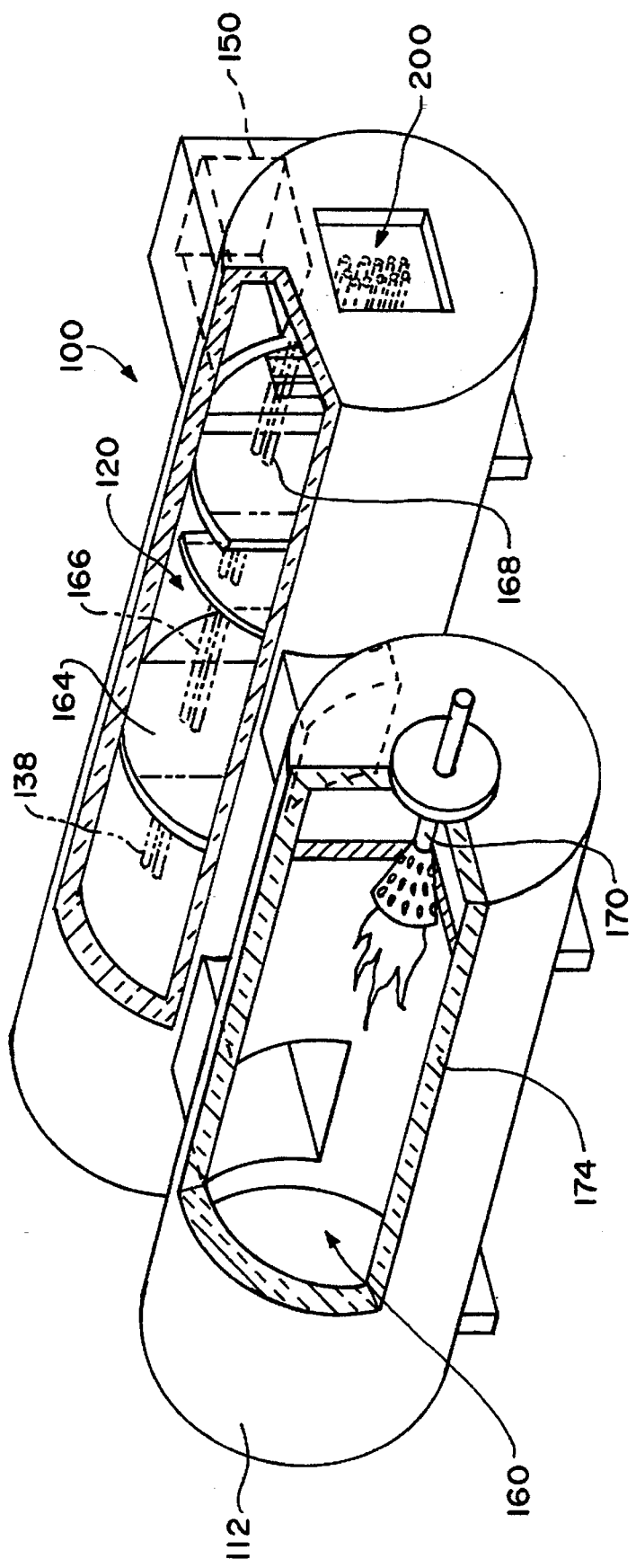
FIG. 6 depicts a perspective view of the modular thermal oxidizing device 100 of this invention with a partial cutaway view to reveal the interior structure of heat exchanger 120.

Referring now to FIG. 6, within the combustion chamber 160 and the heat exchanger 120 is a ceramic insulation layer 174 at the walls thereof. This ceramic insulation layer 174 prevents the outer shell 124 of the combustion chamber from thermally degrading. In this fashion, the chamber 160 and the heat exchanger 120 and the recycling characteristics provide for a longer life to the modular thermal oxidizer 100.

The modular thermal oxidizer 100 is capable of a sustained operating temperature of about 815° C. (1,500° F.). In order for the heat exchanger 120 to manage this heat and tolerate thermal shock, the stainless steel tubes 166 entering the combustion chamber 160 are allowed to float freely in apertures 190 through the hot-side tube sheet 164. This unrestrained design allows the tubes 166 to expand or contract individually, thus eliminating thermal stress of the heat exchanger tubes 166 and hot side tube sheet 164. In the event that some pollutants pass through the hot side tube sheet 164, into the combustion chamber 160 without going through the burner assembly 170, the isolation extension 138 of tubes 166 comes into play. Burn extension 138 is part of each tube 166 extending substantially into the combustion chamber 160. Those pollutants cannot get back into the heat exchanger 120 due to pressure differences. By the time the pollutants 114 reach the tubes 166, the heat from the already converted harmless gasses can convert the pollutants 114 to a harmless entity.

The tubes 166 are welded in the heat exchanger 120 to the cold-side tube sheet 168. The exchanger interior 142 of the heat exchanger 120 and combustion chamber interior 172 are both lined with ceramic insulation 174, which protects and safeguards the outer shell 112 of the modular thermal oxidizer 100 from thermal shock.

In FIG. 5, hot side tube sheet 164 closes an end of heat exchanger 120 adjacent to combustion chamber 160. Cold-side tube sheet 168 closes an opposing end of heat exchanger 120 adjacent to clean outlet 200, through which the harmless exhaust passes.

Incorporation of a burner 170 in the combustion chamber 160 with an eight to one Volumetric Turndown Ratio enables the unit to destroy hydrocarbon emissions at lower air flow rates without the need for additional outside air intake. Burner 170, in the form of a modulating raw gas burner, is directed in and out of the air stream to allow for complete burning at lower process flow rates and idle conditions.

If the hot side sheet 164 may reach too high a temperature, it is possible to situate a cooling ring 280 around hot side sheet 164. Sheet metal forms a hollow tube for cooling ring 280. Air intake pipe 282 receives ambient air from the atmosphere. Air exhaust pipe 284 permits the ambient air to mix with the combustion products 116, and avoid further pollution. In this manner, pollutants 114, especially those containing condensable volatile organic compounds, can be converted to harmless gasses.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A modular thermal oxidizing device having a heat exchanger communicating with a combustion chamber comprising:
   (a) the heat exchanger having a hot side tube sheet at a first exchange end and a cold side tube sheet at a second exchange end;
   (b) the hot side tube sheet including at least one hot side aperture;
   (c) the cold side tube sheet including at least one cold side aperture;
   (d) the heat exchanger having at least one cooling tube;
   (e) the at least one cooling tube being secured at or near a first tube end to the at least one cold side aperture;
   (f) the at least one cooling tube being slidably mounted within the at least one hot side aperture adjacent to a second tube end;
   (g) the first tube end being oppositely disposed from the second tube end; and
   (h) the first tube end extending into the combustion chamber.

2. The modular thermal oxidizing device of claim 1 further comprising:
   (a) the heat exchanger including an internal, cold side bypass means to avoid preignition of the pollutants;
   (b) the heat exchanger including a pollutant receiving means;
   (c) the cold side bypass means including a temperature sensing means connected to a damper means; and
   (d) the pollutant receiving means being adjacent to the damper means; and
   (e) the damper means having an open position in order to provide for the pollutants to pass therethrough.

3. The modular thermal oxidizing device of claim 2 further comprising:
   (a) the heat exchanger being connected to the combustion chamber at the hot side tube sheet;
   (b) the at least one hot side aperture having a clearance in relation to the at least one tube; and
   (c) the at least one hot side aperture having clearance in relation to the at least one tube in to provide for expansion or contraction of the at least one tube.

4. The modular thermal oxidizing device of claim 3 further comprising:
   (a) a thermal resistant coating being mounted on an interior portion of the heat exchanger; and
   (b) a thermal resistant coating being mounted on an interior portion of the combustion chamber.

5. The modular thermal oxidizing device of claim 4 further comprising:
   (a) the thermal resistant coating for the interior portion of the heat exchanger being a fibrous ceramic material; and
   (b) a thermal resistant coating for an interior portion of the combustion chamber being a fibrous ceramic material.

6. The modular thermal oxidizing device of claim 5 further comprising:
  (a) the heat exchanger having a first heating chamber, a second heating chamber, and a third heating chamber;
  (b) the pollutant receiving means communicating with the first heating chamber;
  (c) the first heating chamber communicating with the second heating chamber; and
  (d) the second heating chamber communicating with the third heating chamber.

7. The modular thermal oxidizing device of claim 5 further comprising the damper means permitting direct communication the first chamber, and the third heating chamber when in open position.

8. The modular thermal oxidizing device of claim 7 further comprising:
  (a) the heat exchanger having a flow pattern permitting the pollutants to flow around the at least one heat exchange tube to the combustion chamber;
  (b) the combustion chamber including means to convert the pollutants to harmless gases; and
  (c) the combustion chamber including means to direct the harmless gases through the at least one tube.

9. The modular thermal oxidizing device of claim 8 further comprising:
  (a) the combustion chamber having a modulated burner cone to react to an air flow mounted therein; and
  (b) the at least one aperture in the hot side tube sheet having a diameter of up to about 110 percent of an outside diameter of the at least one tube resting therein.

10. The modular thermal oxidizing device of claim 9 further comprising:
  (a) the first heating chamber being partially separated from the second heating chamber by a first chamber sheet; and
  (b) the second heating chamber being partially separated from the third heating chamber by a second chamber sheet.

11. The modular thermal oxidizing device of claim 10 further comprising the first chamber sheet and the second chamber sheet providing additional support for the at least one tube.

12. The modular thermal oxidizing device of claim 11 further comprising:
  (a) the modular thermal oxidizer further including a programmable logic controller communicating therewith to monitor at least one operational element of the modular thermal oxidizer; and
  (b) an adjusting means for the at least one operational element to maintain the at least one operational element at a parameter.

13. The modular thermal oxidizing device of claim 12 further comprising the first chamber sheet and the second chamber sheet providing additional support for the at least one tube.

14. A heat exchanger for modular thermal oxidizing device:
  (a) the heat exchanger having a hot side tube sheet at a first exchange end and a cold side tube sheet at a second exchange end;
  (b) the hot side tube sheet including at least one hot side aperture;
  (c) the cold side tube sheet including at least one cold side aperture;
  (d) the heat exchanger having at least one cooling tube;
  (e) the at least one cooling tube being secured at or near a first tube end to the at least one cold side aperture;
  (f) the at least one cooling tube being slidably mounted within the at least one hot side aperture adjacent to a second tube end;
  (g) the first tube end being oppositely disposed from the second tube end;
  (h) the first tube end extending beyond the heat exchanger;
  (i) the heat exchanger including an internal, cold side bypass means to avoid preignition of the pollutants;
  (j) the heat exchanger including a pollutant receiving means;
  (k) the cold side bypass means including a temperature sensing means connected to a damper means;
  (l) the pollutant receiving means being adjacent to the damper means; and
  (m) the damper means having an open position in order to provide for the pollutants to pass therethrough.

15. The heat exchanger of claim 14 further comprising:
  (a) the at least one hot side aperture having clearance in relation to the at least one tube in order to provide for expansion or contraction of the at least one tube;
  (b) a thermal resistant coating being mounted on an interior portion of the heat exchanger;
  (c) a thermal resistant coating being mounted on an interior portion of the combustion chamber;
  (d) the thermal resistant coating for the interior portion of the heat exchanger being a fibrous ceramic material;
  (e) a thermal resistant coating for an interior portion of the combustion chamber being a fibrous ceramic material;
  (f) the heat exchanger having a first heating chamber, a second heating chamber, and a third heating chamber;
  (h) the pollutant receiving means communicating with the first heating chamber;
  (i) the first heating chamber communicating with the second heating chamber;
  (j) the second heating chamber communicating with the third heating chamber;
  (k) the damper means permitting direct communication between the first heating chamber, and the third heating chamber when the damper means is in an open position;
  (l) the at least one aperture in the hot side tube sheet having a diameter of up to about 110 percent of an outside diameter of the at least one tube resting therein;
  (m) the first heating chamber being partially separated from the second heating chamber by a first chamber sheet; and
  (n) the second heating chamber being partially separated from the third heating chamber by a second chamber sheet.

16. The modular thermal oxidizing device of claim 15 further comprising the first chamber sheet and the second chamber sheet providing additional support for the at least one tube.

17. A method for converting condensable, volatile, organic compounds to harmless gases comprising:
  (a) collecting the condensable, volatile, organic compounds in the form of pollutants;
  (b) feeding the pollutants to a heat exchange chamber;

(c) warming the pollutants;
(d) combusting the pollutants at a temperature in the range of about 800° C. to about 825° C.;
(e) converting the pollutants to harmless gasses;
(f) recovering energy from the harmless gassses;
(g) combusting an excess of pollutants with the harmless gasses;

(h) extending a cooling tube for the heat exchange chamber beyond a hot side of the heat exchange chamber;
(i) securing the cooling tube in a cold side of the heat exchange chamber; and
(j) slidably mounting the cooling tube in a hot side of the heat exchange chamber.

* * * * *